(12) United States Patent
Matsubayashi et al.

(10) Patent No.: US 10,377,908 B2
(45) Date of Patent: Aug. 13, 2019

(54) CONDUCTIVE POLYMER SOLUTION, CAPACITOR, AND METHOD FOR PRODUCING THE CAPACITOR

(71) Applicant: SHIN-ETSU POLYMER CO., LTD., Tokyo (JP)

(72) Inventors: Sou Matsubayashi, Saitama (JP); Ken-ichi Suzuki, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 35 days.

(21) Appl. No.: 15/757,876

(22) PCT Filed: Jul. 19, 2016

(86) PCT No.: PCT/JP2016/071107
§ 371 (c)(1),
(2) Date: Mar. 6, 2018

(87) PCT Pub. No.: WO2017/043183
PCT Pub. Date: Mar. 16, 2017

(65) Prior Publication Data
US 2018/0334577 A1    Nov. 22, 2018

(30) Foreign Application Priority Data
Sep. 8, 2015 (JP) ................. 2015-176780

(51) Int. Cl.
| | | |
|---|---|---|
| C09D 5/24 | (2006.01) |
| H01G 9/028 | (2006.01) |
| C09D 7/63 | (2018.01) |
| C08G 61/12 | (2006.01) |
| C09D 165/00 | (2006.01) |
| H01G 9/00 | (2006.01) |
| H01G 9/025 | (2006.01) |
| H01G 9/048 | (2006.01) |
| H01G 9/07 | (2006.01) |
| H01G 9/15 | (2006.01) |
| C08K 5/1515 | (2006.01) |
| H01G 9/052 | (2006.01) |

(52) U.S. Cl.
CPC ............ *C09D 5/24* (2013.01); *C08G 61/126* (2013.01); *C09D 7/63* (2018.01); *C09D 165/00* (2013.01); *H01G 9/0029* (2013.01); *H01G 9/0036* (2013.01); *H01G 9/025* (2013.01); *H01G 9/028* (2013.01); *H01G 9/048* (2013.01); *H01G 9/07* (2013.01); *H01G 9/15* (2013.01); *C08G 2261/1424* (2013.01); *C08G 2261/3223* (2013.01); *C08G 2261/514* (2013.01); *C08K 5/1515* (2013.01); *H01G 9/052* (2013.01)

(58) Field of Classification Search
CPC .......... C09D 5/24; C09D 7/63; C09D 165/00; C08G 61/126; C08G 2261/1424; C08G 2261/3223; C08G 2261/514; H01G 9/0029; H01G 9/0036; H01G 9/025; H01G 9/028; H01G 9/048; H01G 9/07; H01G 9/15; H01G 9/052; C08K 5/1515; C08K 5/052
USPC ........................................................ 361/524
See application file for complete search history.

(56) References Cited

U.S. PATENT DOCUMENTS

| | | |
|---|---|---|
| 2006/0047030 A1 | 3/2006 | Yoshida et al. |
| 2006/0202171 A1 | 9/2006 | Yoshida et al. |
| 2008/0123252 A1 | 5/2008 | Kasuga et al. |
| 2010/0091432 A1 | 4/2010 | Sugawara et al. |
| 2013/0177701 A1* | 7/2013 | Ning ............... H01G 9/0036 427/80 |
| 2013/0236636 A1 | 9/2013 | Nobuta et al. |

FOREIGN PATENT DOCUMENTS

| | | |
|---|---|---|
| CN | 101727999 A | 6/2010 |
| CN | 103305000 A | 9/2013 |
| JP | 2003-037024 A | 2/2003 |

(Continued)

OTHER PUBLICATIONS

The foreign patent documents 6-8 were cited in an Sep. 20, 2016 International Search Report of International Application No. PCT/JP2016/071107 which is enclosed.

*Primary Examiner* — Michael P McFadden
(74) *Attorney, Agent, or Firm* — Cowan, Liebowitz & Latman, P.C.; Mark Montague

(57) ABSTRACT

[Object] To provide a conductive polymer solution capable of forming a capacitor having a large capacitance, low ESR, and excellent long-term reliability without using treatment solutions for conductive polymer layer formation differing in composition, and without forming an inside conductive polymer layer by different approaches, the capacitor and a method for producing the capacitor

[Solution] The present invention relates to: a conductive polymer solution which comprises a conductive polymer and a solvent, wherein the conductive polymer comprises a pi-conjugated conductive polymer, a polyanion with which the pi-conjugated conductive polymer has been doped, and a compound formed by reacting an oxirane or oxetane group with an anion making no contribution to the dope in the polyanion, and the solution has a pH in the range of 2.0 to 6.0; a capacitor which includes either the conductive polymer solution or the compounds remaining after removal of the solvent from the solution; and a method for producing a capacitor, comprising impregnating the capacitor with the conductive polymer solution and removing the solvent therefrom.

6 Claims, No Drawings

(56) References Cited

FOREIGN PATENT DOCUMENTS

| | | |
|---|---|---|
| JP | 2006-100774 A | 4/2006 |
| JP | 2006-249303 A | 9/2006 |
| JP | 2008-135509 A | 6/2008 |
| JP | 2008-311582 A | 12/2008 |
| JP | 2010-095580 A | 4/2010 |
| JP | 2013-185031 A | 9/2013 |
| JP | 2015-131890 A | 7/2015 |

* cited by examiner

CONDUCTIVE POLYMER SOLUTION, CAPACITOR, AND METHOD FOR PRODUCING THE CAPACITOR

CROSS REFERENCE

This is a U.S. national stage of application No. PCT/JP2016/071107, filed on Jul. 19, 2016, which claims the benefit of priority based on Japanese Patent Application No. 2015-176780 filed on Sep. 8, 2015 in Japan, the contents of which are hereby incorporated by reference. The contents described in the patents, the present applications, and the literature cited in the present application are hereby incorporated by reference.

TECHNICAL FIELD

The present invention relates to a conductive polymer solution, a capacitor and a method for producing the capacitor.

BACKGROUND ART

In recent years, capacitors used in electronics have been required to reduce impedance (equivalent series resistance) in a high-frequency region with the digitization of the electronics. The capacitors have been further required more strictly to have long-term reliability with reduction in size and thickness and the diversified use environments of these electronics. To cope with these requirements, so-called functional capacitors (hereinafter, referred to as capacitors) containing an oxide film of a valve metal such as aluminum, tantalum or niobium as a dielectric have heretofore been used. The general structure of thus capacitor has, as shown in Patent Literature 1, an anode made of a porous body of a valve metal, a dielectric layer formed by oxidizing the surface of the anode, a conductive solid electrolyte layer, and a cathode having a laminate of a carbon layer, a silver layer and the like. A conductive film containing a pi-conjugated conductive polymer may be used as the solid electrolyte layer.

As for a technique using the conductive film containing such a pi-conjugated conductive polymer, a capacitor comprising a solid electrolyte of the configuration described above has been proposed, wherein the solid electrolyte consists of a composition having a pi-conjugated conductive polymer supplemented with a nitrogen-containing aromatic cyclic compound as an essential component (see Patent Literature 2). A feature of the composition constituting this solid electrolyte is that: the composition contributes to reduction in the equivalent series resistance (hereinafter, referred to as ESR) of the capacitor; and the capacitor can be produced by a convenient process of impregnation with a composition containing a pi-conjugated conductive polymer and drying.

Patent Literature 3 discloses an approach of coating an inside conductive polymer film formed on an anode oxide film of a valve-acting metal (e.g., tantalum, niobium or aluminum) with second polymer polymerization solution C to form an outside conductive polymer film with the conductive polymer polymerization solution, wherein the second polymer polymerization solution C is prepared as follows: a polymer consisting of a repeating structural unit of 3,4-ethylenedioxythiophene, and polystyrenesulfonic acid or a salt thereof are mixed into an aqueous solution, and stirred, followed by the addition of an oxidizing agent for chemical oxidative polymerization; and to the resulting first polymer polymerization solution A, mixed aqueous solution B of a non-aqueous solvent and pure water containing naphthalenesulfonic acid or the like dissolved therein is added.

Likewise, Patent Literature 4 discloses an approach of preparing a solid electrolytic capacitor by establishing a conductive polymer layer on an anode oxide film having a precoat layer and an inside conductive polymer layer formed in order on the surface by coating or impregnation with a water dispersion comprising PEDOT and PSSA containing naphthalenesulfonic acids, high-molecular-weight PSSA, boric acid, mannitol, glycols and the like, and drying and solidifying the resultant by heating. The sulfo group of PSSA with which PEDOT is doped imparts water dispersibility to the water dispersion, but has the function of decreasing the pH of the solution to a strongly acidic region. Therefore, the anode itself is damaged by strong acidity, disadvantageously resulting in elevation in ESR or decrease in capacitance. To solve this disadvantage, a method for increasing pH by the addition of an amine compound has also been proposed (see, for example, Patent Literature 5).

CITATION LIST

Patent Literature

Patent Literature 1: Japanese Patent Laid-Open No. 2003-37024
Patent Literature 2: Japanese Patent Laid-Open No. 2006-100774
Patent Literature 3: Japanese Patent Laid-Open No. 2008-135509
Patent Literature 4: Japanese Patent Laid-Open No. 2008-311582
Patent Literature 5: Japanese Patent Laid-Open No. 2006-249303

SUMMARY OF INVENTION

Technical Problem

Conventional capacitors have problems as described below. The method for producing the capacitor disclosed in Patent Literature 3 allows to produce a capacitor excellent in long-term reliability, but requires the 2-step treatment of forming an inside conductive polymer film by electropolymerization and then forming an outside conductive polymer film. The method for producing a capacitor disclosed in Patent Literature 4 also requires the 2-step treatment mentioned above. Therefore, a facility or a treatment solution for forming an inside conductive polymer layer is necessary in addition to a treatment solution for outside conductive polymer layer formation, and a method for producing a capacitor may become time-consuming and complicated. Furthermore, required characteristics are growing for recent capacitor performance, and much lower ESR and larger capacity are demanded. Hence, the required characteristics are difficult to achieve even by the technique disclosed in Patent Literature 2 using a nitrogen-containing aromatic cyclic compound.

In view of these problems, an object of the present invention is to provide a conductive polymer solution capable of forming a capacitor having a large capacitance, low ESR, and excellent long-term reliability without using treatment solutions for conductive polymer layer formation differing in composition, and without forming an inside conductive polymer layer by different approaches, the capacitor and a method for producing the capacitor.

Solution to Problem

To attain the object, one embodiment of the present invention is a conductive polymer solution having a conductive polymer and a solvent, wherein the conductive polymer comprises a pi-conjugated conductive polymer, a polyanion with which the pi-conjugated conductive polymer is doped, and a compound formed by reacting an oxirane or oxetane group with an anion making no contribution to the dope in the polyanion, and the solution has a pH of 2.0 or higher and 6.0 or lower (namely, a pH is in the range of 2.0 to 6.0).

An alternative embodiment of the present invention may be the conductive polymer solution wherein the pi-conjugated conductive polymer is polyethylenedioxythiophene.

An alternative embodiment of the present invention may be the conductive polymer solution wherein the polyanion is polystyrenesulfonic acid.

An alternative embodiment of the present invention may be the conductive polymer solution wherein an organic compound containing the oxirane or oxetane group is one or two or more compounds selected from propylene oxide, glycidol, 2-[2-(2-butoxy-ethoxy)-ethoxy]-oxirane and 2-{2-[2-(2-butoxy-ethoxy)-ethoxy]-ethoxy}-oxirane.

One embodiment of the present invention is a capacitor including: an anode made of a porous body of a valve metal; a dielectric layer formed by oxidizing the anode surface; a conductive cathode disposed on a side opposite to the anode on the dielectric layer; and a solid electrolyte layer formed between the dielectric layer and the cathode, wherein the capacitor comprises the aforementioned conductive polymer solution or a compound formed from the solution by the removal of the solvent.

One embodiment of the present invention is a method for producing a capacitor, comprising impregnating the aforementioned capacitor with the aforementioned conductive polymer solution, and removing the solvent constituting the conductive polymer solution.

Advantageous Effects of Invention

The present invention can provide a conductive polymer solution capable of forming a capacitor having a large capacitance, low ESR, and excellent long-term reliability without using treatment solutions for conductive polymer layer formation differing in composition, and without forming an inside conductive polymer layer by different approaches, the capacitor and a method for producing the capacitor.

DESCRIPTION OF EMBODIMENTS

Next, embodiments of the conductive polymer solution, the capacitor and the method for producing a capacitor according to the present invention will be described. Elements described in this embodiment are not necessarily essential for the present invention.

1. Conductive Polymer Solution

The conductive polymer solution of this embodiment has a conductive polymer and a solvent. The conductive polymer comprises a pi-conjugated conductive polymer, a polyanion with which the pi-conjugated conductive polymer is doped, and a compound formed by reacting an oxirane or oxetane group with an anion making no contribution to the dope in the polyanion. In addition, the conductive polymer solution has a pH of 2.0 or higher and 6.0 or lower (pH: 2.0-6.0). Here, the solvent may be water, an organic solvent, or a mixture thereof. The conductive polymer solution may further comprise a binder. The conductive polymer used herein with a polyanion as a dopant is preferably formed from fine particles having a particle size of approximately dozens of nanometers. The fine particles are transparent in the visible region owing to the presence of the polyanion having the action of a surfactant and appear to be dissolved in the solvent. In actuality, the fine particles are dispersed in the solvent. However, this state is referred to as a "dispersively solubilized" state herein.

1.1 Conductive Polymer (1) pi-Conjugated Conductive Polymer

Any organic polymer having a backbone constituted by a pi-conjugated system can be preferably used as the pi-conjugated conductive polymer. Examples of the pi-conjugated conductive polymer include polypyrroles, polythiophenes, polyacetylenes, polyphenylenes, polyphenylenevinylenes, polyanilines, polyacenes, polythiophenevinylenes, and copolymers thereof. Polypyrroles, polythiophenes and polyanilines are preferred from the viewpoint of easy polymerization and stability in air.

The pi-conjugated conductive polymer, even in an unsubstituted form, can produce sufficient electroconductivity and compatibility with a binder. To further enhance electroconductivity and dispersibility or solubility in a binder, a functional group such as an alkyl group, a carboxy group, a sulfo group, an alkoxyl group, a hydroxyl group, or a cyano group may be introduced to the pi-conjugated conductive polymer. Specific examples of such a pi-conjugated conductive polymer include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), poly(3-methyl-4-hexyloxypyrrole), poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid) and poly(3-anilinesulfonic acid). Among them, a (co)polymer consisting of one or two or more compounds selected from polypyrrole, polythiophene, poly(N-methylpyrrole), poly(3-methylthiophene), poly(3-methoxythiophene) and poly(3,4-ethylenedioxythiophene) can be preferably used from the viewpoint of a resistance value and reactivity. Polypyrrole or poly(3,4-ethylenedioxythiophene) is more preferred because heat resistance can be improved, in addition to higher electroconductivity. An alkyl-substituted compound such as poly(N-methylpyrrole) or poly(3-methylthiophene) is more preferred from the viewpoint of improving solubility in a solvent, and the compatibility and dispersibility of an added hydrophobic resin. Among the alkyl groups, a methyl group is more preferred, which does not adversely affect electroconductivity.

(2) Polyanion

Any anionic compound can be used as the polyanion without particular limitations. The anionic compound is a compound having, in the molecule, an anion group capable of causing the chemical oxidative doping of the pi-conjugated conductive polymer. The anion group is preferably a phosphoric acid group, a carboxy group, a sulfo group, or the like from the viewpoint of easy production and high stability. Among these anion groups, a sulfo group or a carboxy group is more preferred because of an excellent effect of doping the pi-conjugated conductive polymer.

Examples of the polyanion can include a polymer formed by introducing an anion group into a polymer having no anion group, for example, by the sulfonation of the polymer with a sulfonating agent as well as a polymer obtained by polymerizing an anion group-containing polymerizable monomer. Usually, the polyanion is preferably obtained by polymerizing an anion group-containing polymerizable monomer, from the viewpoint of easy production. Examples of such a production method can include a method of oxidatively polymerizing or radical-polymerizing an anion group-containing polymerizable monomer in a solvent in the presence of an oxidizing agent and/or a polymerization catalyst to obtain a polyanion. More specifically, a predetermined amount of the anion group-containing polymerizable monomer is dissolved in a solvent, and this solution is kept at a given temperature. A solution containing a predetermined amount of an oxidizing agent and/or a polymerization catalyst dissolved in a solvent in advance is added thereto, followed by reaction for a predetermined time. The polymer obtained by this reaction is adjusted to a given concentration with a catalyst. In this production method, the anion group-containing polymerizable monomer may be copolymerized with a polymerizable monomer having no anion group. The oxidizing agent and/or oxidation catalyst and the solvent used for the polymerization of the anion group-containing polymerizable monomer are the same as those used for polymerizing a precursor monomer forming the pi-conjugated conductive polymer.

The anion group-containing polymerizable monomer is a monomer having, in the molecule, a functional group polymerizable with an anion group. Specific examples thereof include vinylsulfonic acid and salts thereof, allylsulfonic acid and salts thereof, methallylsulfonic acid and salts thereof, styrenesulfonic acid and salts thereof, methallyloxybenzenesulfonic acid and salts thereof, allyloxybenzenesulfonic acid and salts thereof, α-methylstyrenesulfonic acid and salts thereof, acrylamido-t-butylsulfonic acid and salts thereof, 2-acrylamido-2-methylpropanesulfonic acid and salts thereof, cyclobutene-3-sulfonic acid and salts thereof, isoprenesulfonic acid and salts thereof, 1,3-butadiene-1-sulfonic acid and salts thereof, 1-methyl-1,3-butadiene-2-sulfonic acid and salts thereof, 1-methyl-1,3-butadiene-4-sulfonic acid and salts thereof, acryloyloxyethylsulfonic acid ($CH_2CH-COO-(CH_2)_2-SO_3H$) and salts thereof, acryloyloxypropylsulfonic acid ($CH_2CH-COO-(CH_2)_3-SO_3H$) and salts thereof, acryloyloxy-t-butylsulfonic acid ($CH_2CH-COO-C(CH_3)_2CH_2-SO_3H$) and salts thereof, acryloyloxy-n-butylsulfonic acid ($CH_2CH-COO-(CH_2)_4-SO_3H$) and salts thereof, 3-butenoyloxyethylsulfonic acid ($CH_2CHCH_2-COO-(CH_2)_2-SO_3H$) and salts thereof, 3-butenoyloxy-t-butylsulfonic acid ($CH_2CHCH_2-COO-C(CH_3)_2CH_2-SO_3H$) and salts thereof, 4-pentenoyloxyethylsulfonic acid ($CH_2CH(CH_2)_2-COO-(CH_2)_2-SO_3H$) and salts thereof, 4-pentenoyloxypropylsulfonic acid ($CH_2CH(CH_2)_2-COO-(CH_2)_3-SO_3H$) and salts thereof, 4-pentenoyloxy-n-butylsulfonic acid ($CH_2CH(CH_2)_2-COO-(CH_2)_4-SO_3H$) and salts thereof, 4-pentenoyloxy-t-butylsulfonic acid ($CH_2CH(CH_2)_2-COO-C(CH_3)_2CH_2-SO_3H$) and salts thereof, 4-pentenoyloxyphenylenesulfonic acid ($CH_2CH(CH_2)_2-COO-C_6H_4-SO_3H$) and salts thereof, 4-pentenoyloxynaphthalenesulfonic acid ($CH_2CH(CH_2)_2-COO-C_{10}H_8-SO_3H$) and salts thereof, methacryloyloxyethylsulfonic acid ($CH_2C(CH_3)-COO-(CH_2)_2-SO_3H$) and salts thereof, methacryloyloxypropylsulfonic acid ($CH_2C(CH_3)-COO-(CH_2)_3-SO_3H$) and salts thereof, methacryloyloxy-t-butylsulfonic acid ($CH_2C(CH_3)-COO-C(CH_3)_2CH_2-SO_3H$) and salts thereof, methacryloyloxy-n-butylsulfonic acid ($CH_2C(CH_3)-COO-(CH_2)_4-SO_3H$) and salts thereof, methacryloyloxyphenylenesulfonic acid ($CH_2C(CH_3)-COO-C_6H_4-SO_3H$) and salts thereof, and methacryloyloxynaphthalenesulfonic acid ($CH_2C(CH_3)-COO-C_{10}H_8-SO_3H$) and salts thereof. Alternatively, a copolymer comprising two or more of these monomers may be used.

Examples of the polymerizable monomer having no anion group include ethylene, propene, 1-butene, 2-butene, 1-pentene, 2-pentene, 1-hexene, 2-hexene, styrene, p-methylstyrene, p-ethylstyrene, p-butylstyrene, 2,4,6-trimethylstyrene, p-methoxystyrene, α-methylstyrene, 2-vinylnaphthalene, 6-methyl-2-vinylnaphthalene, 1-vinylimidazole, vinylpyridine, vinyl acetate, acrylaldehyde, acrylonitrile, N-vinyl-2-pyrrolidone, N-vinylacetamide, N-vinylformamide, N-vinylimidazole, acrylamide, N,N-dimethylacrylamide, acrylic acid, methyl acrylate, ethyl acrylate, propyl acrylate, n-butyl acrylate, isobutyl acrylate, t-butyl acrylate, isooctyl acrylate, isononylbutyl acrylate, lauryl acrylate, allyl acrylate, stearyl acrylate, isobornyl acrylate, cyclohexyl acrylate, benzyl acrylate, ethyl carbitol acrylate, phenoxyethyl acrylate, hydroxyethyl acrylate, methoxyethyl acrylate, ethoxyethyl acrylate, methoxybutyl acrylate, methacrylic acid, methyl methacrylate, ethyl methacrylate, n-butyl methacrylate, isobutyl methacrylate, t-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, acryloylmorpholine, vinylamine, N,N-dimethylvinylamine, N,N-diethylvinylamine, N,N-dibutylvinylamine, N,N-di-t-butylvinylamine, N,N-diphenylvinylamine, N-vinylcarbazole, vinyl alcohol, vinyl chloride, vinyl fluoride, methyl vinyl ether, ethyl vinyl ether, cyclopropene, cyclobutene, cyclopentene, cyclohexene, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene, and 2-hydroxy-1,3-butadiene.

The degree of polymerization of the polyanion thus obtained is not particularly limited. The degree of polymerization is usually approximately 10 to 100,000 monomer units and is more preferably approximately 50 to 10,000 monomer units from the viewpoint of improving solubilization in a solvent, dispersibility and electroconductivity.

Specific examples of the polyanion can preferably include polyvinylsulfonic acid, polystyrenesulfonic acid, polyisoprenesulfonic acid, polyacryloyloxyethylsulfonic acid, polyacryloyloxybutylsulfonic acid and poly(2-acrylamido-2-methyl-1-propanesulfonic acid). When the obtained anionic compound is an anion salt, it is preferred to convert the anion salt to an anion acid. Examples of a method for the conversion to an anion acid can include an ion-exchange method using an ion-exchange resin, a dialysis method, and an ultrafiltration method. Among these methods, an ultrafiltration method is preferred from the viewpoint of easy operation. However, an ion-exchange method is preferably used when decrease in metal ion concentration is necessary.

The pi-conjugated conductive polymer and the polyanion used in combination can be selected from their respective groups. The combination of poly(3,4-ethylenedioxythiophene) which is one example of the pi-conjugated conductive polymer and polystyrenesulfonic acid which is one example of the polyanion is preferred from the viewpoint of chemical stability, electroconductivity, preservation stability, easy availability, etc. The poly(3,4-ethylenedioxythiophene) and the polystyrenesulfonic acid may be synthesized, as mentioned above, by polymerization in the state of an aqueous solution or an aqueous dispersion in which the monomer for the conductive polymer and the dopant coexist in the presence of an oxidizing agent. Alternatively, a commercially available water dispersion of a conductive polymer/dopant complex may be used. Examples of the commercially available conductive polymer/dopant water dispersion include "Clevios" (trade name, manufactured by Heraeus Holding GmbH, a water dispersion of PEDOT/PSS) and "Orgacon" (trade name, Agfa-Gevaert NV, a water dispersion of PEDOT/PSS).

The content of the polyanion preferably ranges from 10 to 1,000 parts by mass, more preferably 50 to 500 parts by mass, with respect to 100 parts by mass of the pi-conjugated conductive polymer. When the content of the polyanion is 10 parts by mass or larger, an effect of doping the pi-conjugated conductive polymer can be enhanced, and electroconductivity can be enhanced. In addition, solubility in a solvent is enhanced, and a solution of the conductive polymer in a uniformly dispersed state is easily obtained. On the other hand, when the content of the polyanion is 1,000 parts by mass or smaller, the percentage of the contained pi-conjugated conductive polymer can be relatively large, and higher electroconductivity can be exerted.

(3) Compound Formed by Reacting Oxirane or Oxetane Group with Anion Making No Contribution to Dope in Polyanion The reaction product of an oxirane and/or oxetane group-containing organic compound with an anion making no contribution to the dope in the polyanion is obtained by adding the oxirane and/or oxetane group-containing organic compound to the complex of the pi-conjugated conductive polymer and the polyanion mentioned above, followed by reaction. For example, the reaction product is obtained by mixing a complex solution of the pi-conjugated conductive polymer and the polyanion with which the polymer is doped, with the oxirane and/or oxetane group-containing organic compound, and stirring the mixture at a temperature of 0° C. to 100° C. If necessary, the reaction may be performed in a mixed solvent supplemented with a water-soluble solvent such as methanol or ethanol, or a surfactant. After the reaction, the solvent, water, and a portion of the oxirane and/or oxetane group-containing organic compound used may be removed with an evaporator or the like to adjust the concentration to a necessary one.

The oxirane and/or oxetane group-containing organic compound is not particularly limited as long as the oxirane and/or oxetane group-containing organic compound binds to or coordinates with the anion group or the electron-withdrawing group of the polyanion. An organic compound containing one or less oxirane and/or oxetane group in one molecule is more preferably used because aggregation or gelation can be reduced. The molecular weight of the oxirane and/or oxetane group-containing organic compound preferably ranges from 50 to 2,000 in consideration of easy solubility in an organic solvent.

The amount of the oxirane and/or oxetane group-containing organic compound is preferably 0.1 to 50, more preferably 1.0 to 30.0, in terms of a weight ratio of the pi-conjugated conductive polymer to the anion group or the electron-withdrawing group in the polyanion, also for setting the pH to particular pH in the range of 2.0-6.0. When the amount of the oxirane and/or oxetane group-containing organic compound is 0.1 or more in terms of the weight ratio, the pH is easily adjusted to the range described above, and the oxirane and/or oxetane group-containing organic compound can be modified to the extent that the resulting oxirane and/or oxetane group-containing organic compound is also dissolved in a solvent rich in an organic solvent. On the other hand, when the amount of the oxirane and/or oxetane group-containing organic compound is 50 or less in terms of the weight ratio, the pH is easily adjusted to the range described above, and a redundant oxirane and/or oxetane group-containing organic compound is rarely deposited in the conductive polymer solution. Therefore, reduction in the electroconductivity and mechanical properties of the resulting conductive coating is easily prevented.

The oxirane and/or oxetane group-containing organic compound may be a compound having any molecular structure as long as the compound has an oxirane or oxetane group in the molecule. However, the oxirane and/or oxetane group-containing organic compound preferably has 4 or less carbon atoms and may have 5 or more carbon atoms when having an OH group. When water is used in a large amount during the production process, it is preferred to avoid, as practically as possible, using a compound containing an alkoxysilyl group having a functional group hydrolyzable or reactive with water. When the production process is performed via freeze drying, a compound containing an alkoxysilyl group can also be dispersed or dissolved in a solvent with its features maintained and as such, may be used.

Hereinafter, examples of the oxirane and/or oxetane group-containing organic compound will be listed.

(Oxirane Group-Containing Organic Compound)

Examples of a monofunctional oxirane group-containing organic compound can include propylene oxide, 2,3-butylene oxide, isobutylene oxide, 1,2-butylene oxide, 1,2-epoxyhexane, 1,2-epoxyheptane, 1,2-epoxypentane, 1,2-epoxyoctane, 1,2-epoxydecane, 1,3-butadiene monoxide, 1,2-epoxytetradecane, glycidyl methyl ether, 1,2- epoxyoctadecane, 1,2-epoxyhexadecane, ethyl glycidyl ether, glycidyl isopropyl ether, tert-butyl glycidyl ether, 1,2-epoxyeicosane, 2-(chloromethyl)-1,2-epoxypropane, glycidol, epichlorohydrin, epibromohydrin, butyl glycidyl ether, 1,2-epoxyhexane, 1,2-epoxy-9-decane, 2-(chloromethyl)-1,2-epoxybutane, 2-ethylhexyl glycidyl ether, 1,2-epoxy-1H,1H,2H,2H,3H,3H-trifluorobutane, allyl glycidyl ether, tetracyanoethylene oxide, glycidyl butylate, 1,2-epoxycyclooctane, glycidyl methacrylate, 1,2-epoxycyclododecane, 1-methyl-1,2-epoxycyclohexane, 1,2-epoxycyclopentadecane, 1,2-epoxycyclopentane, 1,2-epoxycyclohexane, 1,2-epoxy-1H,1H,2H,2H,3H,3H-heptadecafluorobutane, 3,4-epoxytetrahydrofuran, glycidyl stearate, 3-glycidyloxypropyltrimethoxysilane, epoxysuccinic acid, glycidyl phenyl ether, isophorone oxide, α-pinene oxide, 2,3-epoxynorbornene, benzyl glycidyl ether, diethoxy(3-glycidyloxypropyl)methylsilane, 3-[2-(perfluorohexyl)ethoxy]-1,2-epoxypropane, 1,1,1,3,5,5,5-heptamethyl-3-(3-glycidyloxypropyl)trisiloxane, 9,10-epoxy-1,5-cyclododecadiene, glycidyl 4-tert-butylbenzoate, 2,2-bis(4-glycidyloxyphenyl)propane, 2-tert-butyl-2-[2-(4-chlorophenyl)]ethyloxirane, styrene oxide, glycidyl trityl ether, 2-(3,4-epoxycyclohexyl) ethyltrimethoxysilane, 2-phenylpropylene oxide, cholesterol-5α,6α-epoxide, stilbene oxide, glycidyl p-toluenesulfonate, ethyl 3-methyl-3-phenylglycidate, N-propyl-N-(2,3-epoxypropyl)perfluoro-n-octylsulfonamide, (2S,3S)-1,2-epoxy-3-(tert-butoxycarbonylamino)-4-phenylbutane, (R)-glycidyl 3-nitrobenzenesulfonate, 3-nitrobenzenesulfonic acid-glycidyl, parthenolide, N-glycidylphthalimide, endrin, dieldrin, 4-glycidyloxycarbazole, [oxiranylmethyl] 7,7-dimethyloctanoate, 2-[2-(2-butoxy-ethoxy)-ethoxy]-oxirane and 2-{2-[2-(2-butoxy-ethoxy)-ethoxy]-ethoxy}-oxirane. Among those listed above, propylene oxide, glycidol, 2-[2-(2-butoxy-ethoxy)-ethoxy]-oxirane and 2-{2-[2-(2-butoxy-ethoxy)-ethoxy]-ethoxy}-oxirane are more preferred.

Examples of a polyfunctional oxirane group-containing organic compound can include 1,7-octadiene diepoxide, neopentyl glycol diglycidyl ether, 4-butanediol diglycidyl ether, 1,2:3,4-diepoxybutane, diglycidyl 1,2-cyclohexanedicarboxylate, isocyanuric acid triglycidyl neopentyl glycol diglycidyl ether, 1,2:3,4-diepoxybutane, polyethylene glycol #200 diglycidyl ether, ethylene glycol diglycidyl ether, diethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, trimethylolpropane triglycidyl ether, and hydrogenated bisphenol A diglycidyl ether.

(Oxetane Group-Containing Organic Compound)

Examples of a monofunctional oxetane group-containing organic compound can include 3-ethyl-3-hydroxymethyloxetane (=oxetane alcohol), 2-ethylhexyloxetane, (3-ethyl-3-oxetanyl)methyl acrylate and (3-ethyl-3-oxetanyl)methacrylate.

Examples of a polyfunctional oxetane group-containing organic compound can include xylylenebisoxetane, 3-ethyl-3{[(3-ethyloxetan-3-yl)methoxy]methyl}oxetane, 1,4-benzenedicarboxylic acid and bis{[3-ethyl-3-oxetanyl]methyl} ester.

As mentioned above, the oxirane or oxetane group is reacted with the anion group making no contribution to the dope in the polyanion. The oxirane or oxetane group is needed to increase the strong acidity of a solution derived from the anion group of the polyanion to a weak acidic region (specifically, pH=2.0 or higher and 6.0 or lower).

1.2 Solvent

The solvent constituting the conductive polymer solution contains water, an organic solvent, or a mixture thereof. The content percentage of water in the solvent containing water is preferably 60 to 100%. Examples of the organic solvent that may be contained in the solvent can preferably include: polar solvents typified by N-methyl-2-pyrrolidone, N,N-dimethylformamide, N,N-dimethylacetamide, dimethyl sulfoxide, hexamethylene phosphonium triamide, acetonitrile and benzonitrile; phenols typified by cresol, phenol and xylenol; alcohols typified by methanol, ethanol, propanol and butanol; ketones typified by acetone, methyl ethyl ketone and methyl isobutyl ketone; esters typified by ethyl acetate, propyl acetate and butyl acetate; hydrocarbons typified by hexane, heptane, benzene, toluene and xylene; carboxylic acids typified by formic acid and acetic acid; carbonate compounds typified by ethylene carbonate and propylene carbonate; ether compounds typified by dioxane and diethyl ether; chain-like ethers typified by ethylene glycol dialkyl ether, propylene glycol dialkyl ether, polyethylene glycol dialkyl ether and polypropylene glycol dialkyl ether; heterocyclic compounds typified by 3-methyl-2-oxazolidinone; and nitrile compounds typified by acetonitrile, glutarodinitrile, methoxyacetonitrile, propionitrile and benzonitrile. These organic solvents may be used alone or as a mixture of two or more. Among these organic solvents, alcohols, ketones, ethers, esters and hydrocarbons can be more preferably used from the viewpoint of easy miscibility with various organic substances. When the conductive polymer solution is used in a capacitor, a solid conductive polymer is dispersively solubilized in a solvent to produce a coating material. An element for a capacitor is dipped therein and dried to partially or wholly remove the solvent. Thus, when the solvent contains an organic solvent, a solvent having a low boiling point is preferably selected. This can shorten a drying time in conductive polymer layer formation and can enhance productivity.

1.3 Other Additives (1) Binder

The conductive polymer solution may preferably comprise a resin having the functions of a binder (also referred to as a binder or a binder resin) from the viewpoint of enhancing the scratch resistance and hardness of a conductive polymer layer and improving the adhesion of this layer to other layers in a capacitor. The binder preferably contains an alkoxysilyl group. The binder is preferably alkoxysilane, a condensate of alkoxysilane, or a reaction product of the condensate of alkoxysilane with a reactive resin reactable therewith and has a function of bonding pi-conjugated conductive polymers together.

The condensate of alkoxysilane is obtained by heating and dehydrating the alkoxysilane. The alkoxysilane preferably has an organic functional group (e.g., an epoxy group, a mercapto group, an amino group or a carboxy group). The organic functional group may be bonded directly to the silicon atom or may be bonded to the silicon atom via a divalent hydrocarbon group having 1 to 10 carbon atoms.

Specific examples of the alkoxysilane having an organic functional group include γ-methacryloxypropyltrimethoxysilane, γ-methacryloxypropyltriethoxysilane, γ-methacryloxypropyltributoxysilane, γ-methacryloxypropylmethyldimethoxysilane, γ-methacryloxypropylmethyldiethoxysilane, γ-acryloxypropyltrimethoxysilane, γ-acryloxypropyltriethoxysilane, γ-acryloxypropylmethyldimethoxysilane, γ-methacryloxymethyltrimethoxysilane, γ-acryloxymethyltrimethoxysilane, vinyltrimethoxysilane, vinyltriethoxysilane, vinyltributoxysilane, vinylmethyldimethoxysilane, 5-hexenyltrimethoxysilane, 9-decenyltrimethoxysilane, styryltrimethoxysilane, γ-chloropropyltrimethoxysilane, γ-bromopropyltrimethoxysilane, trifluoropropyltrimethoxysilane, nonafluorohexyltrimethoxysilane, γ-aminopropyltrimethoxysilane, γ-aminopropyltriethoxysilane, γ-aminopropyltributoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropyltriethoxysilane, N-(β-aminoethyl)-γ-aminopropyltributoxysilane, N-(β-aminoethyl)-γ-aminopropylmethyldimethoxysilane, N-phenyl-γ-aminopropyltrimethoxysilane, β-(3,4-epoxycyclohexyl)ethyltrimethoxysilane, γ-glycidoxypropyltrimethoxysilane, γ-glycidoxypropyltriethoxysilane and γ-glycidoxymethyldimethoxysilane. Among these compounds, β-(3,4-epoxycyclohexyl)ethyltrimethoxysilane, γ-glycidoxypropyltrimethoxysilane, γ-glycidoxypropyltriethoxysilane and γ-glycidoxymethyldimethoxysilane are more preferred from the viewpoint of higher solvent resistance. These alkoxysilanes having an organic functional group may be used alone or in combination of two or more.

The alkoxysilane may have no organic functional group. Examples of tetraalkoxysilane having no organic functional group include tetramethoxysilane, tetraethoxysilane, tetraisopropoxysilane and tetrabutoxysilane. Among them, tetramethoxysilane or tetraethoxysilane is preferred because the alkoxysilane group is easily hydrolyzed. These alkoxysilanes having no organic functional group may be used alone or in combination of two or more.

The reactive resin has a functional group reactable with the condensate of alkoxysilane. The functional group reactable with the condensate of alkoxysilane is specifically a functional group reactable with silanol formed by the hydrolysis of the condensate of alkoxysilane, or a functional group reactive with the organic functional group of the condensate of alkoxysilane. Examples of such a functional group include a carboxy group, a sulfonic acid group, a nitrile group, a hydroxy group, a nitrile group, an amino group, an alkoxysilyl group and a silanol group. Among these functional groups, an epoxy group is preferred from the viewpoint of solvent resistance. Examples of the reactive resin include epoxy resin, urethane resin, acrylic resin, alkyd resin, silicone resin, fluorine resin and polyester resin. Among them, at least one resin selected from the group consisting of epoxy resin, urethane resin and polyester resin is preferred, and epoxy resin is more preferred, from the viewpoint of reactivity with alkoxysilane and adhesion with a base material.

The content of the binder in the conductive polymer solution is preferably 200 to 9,000 parts by mass, more preferably 500 to 6,000 parts by mass, with respect to 100 parts by mass in total of the pi-conjugated conductive polymer and the polyanion. When the content of the binder is 200 parts by mass or larger, the resulting conductive coating can have higher solvent resistance. When the content is 9,000 parts by mass or smaller, sufficient electroconductivity can be secured.

(2) Electroconductivity-Improving Agent

To further improve the electroconductivity of a coating, the conductive polymer solution preferably has one or more electroconductivity-improving agents selected from the following compounds:
(2.1) a nitrogen-containing aromatic cyclic compound,
(2.2) a compound having two or more hydroxy groups,
(2.3) a compound having two or more carboxy groups,
(2.4) a compound having one or more hydroxy groups and one or more carboxy groups,
(2.5) a compound having an amide group,
(2.6) a compound having an imide group,
(2.7) a lactam compound, and
(2.8) others.

(2.1) Nitrogen-Containing Aromatic Cyclic Compound

Examples of the nitrogen-containing aromatic cyclic compound preferably include pyridines containing one nitrogen atom and derivatives thereof, imidazoles containing two nitrogen atoms and derivatives thereof, pyrimidines and derivatives thereof, pyrazines and derivatives thereof, and triazines containing three nitrogen atoms and derivatives thereof. Pyridines and derivatives thereof, imidazoles and derivatives thereof, and pyrimidines and derivatives thereof are preferred from the viewpoint of solubility in a solvent, etc.

Specific examples of the pyridines and the derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl) propane, 2-pyridinecarboxaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid and 3-pyridinesulfonic acid.

Specific examples of the imidazoles and the derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl)imidazole (N-hydroxyethylimidazole), 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole and 2-(2-pyridyl)benzimidazole.

Specific examples of the pyrimidines and the derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine and 2,4-pyrimidinediol.

Specific examples of the triazines and the derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridine-1,3,5-triazine, 3-(2-pyridine)-5,6-bis(4-phenylsulfonic acid)-1,2,4-triazine disodium, 3-(2-pyridine)-5,6-diphenyl-1,2,4-triazine, 3-(2- pyridine)-5,6-diphenyl-1,2,4-triazine-ρ,ρ'-disulfonic acid disodium and 2-hydroxy-4,6-dichloro-1,3,5-triazine.

(2.2) Compound Having Two or More Hydroxy Groups

Examples of the compound having two or more hydroxy groups include: polyhydric aliphatic alcohols such as propylene glycol, 1,3-butylene glycol, 1,4-butylene glycol, glycerin, diglycerin, D-glucose, D-glucitol, isoprene glycol, dimethylolpropionic acid, butanediol, 1,5-pentanediol, 1,6-hexanediol, 1,9-nonanediol, neopentyl glycol, trimethylolethane, trimethylolpropane, pentaerythritol, dipentaerythritol, thiodiethanol, glucose, tartaric acid, D-glucaric acid and glutaconic acid; polymer alcohols such as cellulose, polysaccharides and sugar alcohols; aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'dihydroxydiphenylsulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, 1,4-dihydroxy-2-naphthoic acid phenyl ester, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate and ethyl gallate; and potassium hydroquinonesulfonate.

(2.3) Compound Having Two or More Carboxy Groups

Examples of the compound having two or more carboxy groups include: aliphatic carboxylic acid compounds such as maleic acid, fumaric acid itaconic acid, citraconic acid, malonic acid, 1,4-butanedicarboxylic acid, succinic acid, tartaric acid, adipic acid, D-glucaric acid, glutaconic acid and citric acid; aromatic carboxylic acid compounds having at least one or more carboxy groups bonded to the aromatic ring, such as phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic acid, biphenyltetracarboxylic dianhydride, benzophenonetetracarboxylic dianhydride, naphthalenedicarboxylic acid, trimellitic acid and pyromellitic acid; and diglycolic acid, oxydibutyric acid, thiodiacetic acid, thiodibutyric acid, iminodiacetic acid and iminobutyric acid.

(2.4) Compound Having One or More Hydroxy Groups and One or More Carboxy Groups

Examples of the compound having one or more hydroxy groups and one or more carboxy groups include tartaric acid, glyceric acid, dimethylolbutanoic acid, dimethylolpropanoic acid, D-glucaric acid and glutaconic acid.

(2.5) Compound Having Amide Group

Examples of the compound having an amide group (hereinafter, referred to as an "amide compound") is a monomolecular compound having an amide bond represented by —CO—NH— (wherein the CO moiety is a double bond) in the molecule. Specifically, examples of the amide compound include a compound having functional groups at both ends of the bond described above, a compound having a cyclic compound bonded to one end of the bond described above, and urea and urea derivatives in which the functional groups at both ends are hydrogen. Specific examples of the amide compound include acetamide, malonamide, succinamide, maleamide, fumaramide, benzamide, naphthamide, phthalamide, isophthalamide, terephthalamide, nicotinamide, isonicotinamide, 2-furamide, formamide, N-methylformamide, propionamide, propiolamide, butyramide, isobutyramide, methacrylamide, palmitamide, stearylamide, oleamide, oxamide, glutaramide, adipamide, cinnamamide, glycolamide, lactamide, glyceramide, tartaramide, citramide, glyoxylamide, pyruvamide, acetoacetamide, dimethylacetamide, benzylamide, anthranilamide, ethylenediaminetetraacetamide, diacetamide, triacetamide, dibenzamide, tribenzamide, rhodanine, urea, 1-acetyl-2-thiourea, biuret, butylurea, dibutylurea, 1,3-dimethylurea, 1,3-diethylurea and their derivatives.

Alternatively, acrylamide may be used as the amide compound. Examples of the acrylamide include N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmethacrylamide, 2-hydroxyethylacrylamide, 2-hydroxyethylmethacrylamide, N-methylolacrylamide and N-methylolmethacrylamide. The molecular weight of the amide compound is preferably 46 to 10,000, more preferably 46 to 5,000, particularly preferably 46 to 1,000.

(2.6) Compound Having Imide Group

Examples of the compound having an imide group (hereinafter, referred to as an "imide compound") include phthalimide and phthalimide derivatives, succinimide and succinimide derivatives, benzimide and benzimide derivatives, maleimide and maleimide derivatives, and naphthalimide and naphthalimide derivatives, in terms of the skeleton thereof.

The imide compound is classified into aliphatic imide, aromatic imide, etc. according to the type of functional groups at both ends. Aliphatic imide is preferred from the viewpoint of solubility. The aliphatic imide compound is further classified into a saturated aliphatic imide compound having a saturated bond between intramolecular carbon atoms and an unsaturated aliphatic imide compound having an unsaturated bond between intramolecular carbon atoms. The saturated aliphatic imide compound is a compound represented by $R^1$—CO—NH—CO—$R^2$ wherein both $R^1$ and $R^2$ are saturated hydrocarbons. Specific examples thereof include cyclohexane-1,2-dicarboximide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoinacetic acid, N-hydroxy-5-norbornene-2,3-dicarboximide, semicarbazide, α,α-dimethyl-6-methylsuccinimide, bis[2-(succinimidoxycarbonyloxy)ethyl]sulfone, α-methyl-α-propylsuccinimide and cyclohexylimide. The unsaturated aliphatic imide compound is a compound represented by $R^1$—CO—NH—CO—$R^2$ wherein one or both of $R^1$ and $R^2$ are one or more unsaturated bonds. Specific examples thereof include 1,3-dipropylene urea, maleimide, N-methylmaleimide, N-ethylmaleimide, N-hydroxymaleimide, 1,4-bismaleimidobutane, 1,6-bismaleimidohexane, 1,8-bismaleimidooctane and N-carboxyheptylmaleimide.

The molecular weight of the imide compound is preferably 60 to 5,000, more preferably 70 to 1,000, particularly preferably 80 to 500.

(2.7) Lactam Compound

The lactam compound is intramolecular cyclic amide of aminocarboxylic acid and is a compound having —CO—NR$^3$— (wherein R$^3$ is hydrogen or an arbitrary substituent) on a portion of the ring. However, one or more carbon atoms on the ring may be unsaturated or replaced with a heteroatom. Examples of the lactam compound include pentano-4-lactam, 4-pentanelactam-5-methyl-2-pyrrolidone, 5-methyl-2-pyrrolidinone, hexano-6-lactam and 6-hexanelactam.

(2.8) Others

In addition to those described above, dimethyl sulfoxide (DMSO); a hydroxy group-containing carboxylic acid ester compound such as hydroxyethyl acrylate or ethyl lactate; or a hydroxy group-containing ether compound such as ethylene glycol monoethyl ether or propylene glycol monoethyl ether may be used as the electroconductivity-improving agent.

The content of the electroconductivity-improving agent is preferably 10 to 10,000 parts by mass, more preferably 30 to 5,000 parts by mass, with respect to 100 parts by mass in total of the pi-conjugated conductive polymer and the polyanion. When the content of the electroconductivity-improving agent is equal to or larger than the lower limit and is equal to or smaller than the upper limit, electroconductivity can be further improved.

2. Method for Producing Conductive Polymer Solution

The conductive polymer solution of this embodiment can be produced by a method given below as one example.

2.1 Production Process from Solution of Conductive Polymer/Polyanion Complex Water Dispersion A conductive polymer/polyanion complex water dispersion is polymerized in the state of an aqueous solution or a water dispersion in which the monomer for the conductive polymer and the dopant coexist in the presence of an oxidizing agent. However, not only such polymerization from the monomer but a commercially available conductive polymer/dopant water dispersion may be used. Examples of the commercially available conductive polymer/dopant water dispersion can include a PEDOT/PSS water dispersion from Heraeus Holding GmbH (trade name: Clevios) and a PEDOT/PSS water dispersion from Agfa-Gevaert NV (trade name: Orgacon). Next, an oxirane and/or oxetane group-containing organic compound is added to the water dispersion such that the pH of the finally obtained conductive polymer solution ranges from 2.0 to 6.0, followed by stirring. As a result, the cyclic ether of the oxirane and/or oxetane group-containing organic compound is ring-opened, and OH of an anion group making no contribution to the dope in the polyanion reacts therewith. Then, the obtained reaction solution is concentrated, filtered, or dried to obtain a conductive polymer. Then, the obtained solid conductive polymer is solubilized or dispersed in a solvent to obtain a conductive polymer solution. If other additives are added, it is preferred to mix the additives into the solvent in advance or mix the additives together with the conductive polymer with the solvent. Alternatively, the oxirane and/or oxetane group-containing organic compound is added together with the solvent to the water dispersion. Then, the conductive polymer is shifted to a water-insoluble solvent phase by the addition of a water-insoluble organic solvent, preferably, during or after the reaction of the anion with the oxirane or oxetane group. If necessary, after a step such as dehydration, the conductive polymer may be solubilized or dispersed in the solvent.

2.2 Production Process from Freeze-Dried Conductive Polymer/Polyanion Complex Solid Matter An appropriate amount of water and/or a solvent containing an oxirane and/or oxetane group-containing organic compound dissolved therein is added to an already solid conductive polymer in the state of a polyanion-doped pi-conjugated conductive polymer, followed by, preferably, the reaction of the anion with the oxirane or oxetane group. Then, the reaction solution is concentrated, filtered or dried. Then, preferably, the obtained concentrate or solid is solubilized or dispersed in the solvent. Alternatively, in the production described above, the conductive polymer is shifted to a water-insoluble solvent phase by the addition of a water-insoluble organic solvent after the reaction of the anion with the oxirane or oxetane group. If necessary, after a step such as dehydration, the conductive polymer may be dissolved or dispersed in a solvent. This method employs the freeze-dried conductive polymer as a starting material and can therefore shorten the time required, particularly, for the concentration step.

The amount of the oxirane and/or oxetane group-containing organic compound is an amount that allows the pH of the finally obtained conductive polymer solution to range from 2.0 to 6.0. For example, when propylene oxide is added to a PEDOT-PSS conductive polymer solution, it is preferred to add 5 to 50 parts by mass with respect to 1 part by mass of the PEDOT-PSS conductive polymer. When glycidol is added to the PEDOT-PSS conductive polymer solution, preferably 3.5 to 50 parts by mass, more preferably 4 to 50 parts by mass, are added with respect to 1 part by mass of the PEDOT-PSS conductive polymer. When 2-{2-[2-(2-butoxy-ethoxy)-ethoxy]-ethoxy}-oxirane is added to the PEDOT-PSS conductive polymer solution, preferably 3 to 50 parts by mass, more preferably 4 to 25 parts by mass, are added with respect to 1 part by mass of the PEDOT-PSS conductive polymer.

3. Capacitor

The capacitor of this embodiment is a capacitor including: an anode made of a porous body of a valve metal; a dielectric layer formed by oxidizing the anode surface; a cathode made of a conductive material and disposed on a side opposite to the anode on the dielectric layer; and a solid electrolyte layer formed between the dielectric layer and the cathode. The solid electrolyte layer is a layer including a conductive polymer comprising a pi-conjugated conductive polymer, a polyanion with which the pi-conjugated conductive polymer is doped, and a reaction product of an oxirane and/or oxetane group-containing organic compound with an anion making no contribution to the dope in the polyanion. The capacitor comprises the conductive polymer solution or a compound formed from the solution by the removal of the solvent.

4. Method for Producing Capacitor

The capacitor of this embodiment is produced through the step of coating dielectric layer surface with a conductive polymer solution comprising a pi-conjugated conductive polymer, a polyanion with which the pi-conjugated conductive polymer is doped, and a reaction product of an oxirane and/or oxetane group-containing organic compound with an anion making no contribution to the dope in the polyanion, followed by drying to form a solid electrolyte layer. This step is the step of impregnating the capacitor with the conductive polymer solution and removing the solvent constituting the conductive polymer solution. Next, the method for producing the capacitor of the present invention will be described in more detail. The method for producing the capacitor of this embodiment has the steps of: preparing a conductive polymer dispersion comprising a pi-conjugated conductive polymer, a polyanion with which the pi-conjugated conductive polymer is doped, and a reaction product of an oxirane and/or oxetane group-containing organic compound with an anion making no contribution to the dope in the polyanion; oxidizing the surface of an anode made of a porous body of a valve metal to form a dielectric layer; forming a cathode at a position facing the dielectric layer; and coating the dielectric layer surface with the conductive polymer dispersion, followed by drying to form a solid electrolyte layer.

4.1 Method for Preparing Conductive Polymer Dispersion

A method for preparing the conductive polymer solution comprising a pi-conjugated conductive polymer, a polyanion with which the pi-conjugated conductive polymer is doped, and a reaction product of an oxirane and/or oxetane group-containing organic compound with an anion making no contribution to the dope in the polyanion is as described above. The solution thus obtained is mixed with a hydroxy group-containing aromatic compound, a water-soluble polymer compound or a water-dispersible polymer compound, a sulfo group-containing dicarboxylic acid, an aliphatic compound having four or more hydroxy groups in the molecule, a high-boiling solvent, an additive for improvement in electroconductivity, a binder, a silane coupling agent, water, and the like, and the mixture is stirred and, if necessary, dissolved by heating. Dispersion treatment with a bead mill, a high-pressure dispersing machine, ultrasound, or the like can be further performed to improve the stability of the conductive polymer dispersion. Among others, dispersion treatment with a high-pressure dispersing machine is more preferred because dispersion stability can be conveniently improved.

(1) High-Pressure Dispersion Treatment Step

The high-pressure dispersion treatment is the treatment of allowing the solution to be dispersed to counter-collide at high pressure or pass through an orifice or a slit at high pressure using a high-pressure dispersing machine to disperse the polyanion and the conductive polymer solution. For example, a commercially available high-pressure dispersing machine such as a high-pressure homogenizer can be preferably used as the high-pressure dispersing machine. The high-pressure homogenizer is, for example, an apparatus equipped with a high pressure-generating portion pressurizing the solution to be dispersed, etc., and a counter collision portion or an orifice or slit portion performing dispersion. A high-pressure pump such as a plunger pump is preferably used as the high pressure-generating portion. The high-pressure pump has various formats such as simplex, duplex and triplex formats, and any of the formats can be adopted. When the solution to be dispersed is allowed to counter-collide at high pressure in the high-pressure dispersion treatment, the treatment pressure is preferably 50 MPa or higher, more preferably 100 MPa or higher, particularly preferably 130 MPa or higher, because the high-pressure dispersion treatment is more effective. A treatment pressure exceeding 300 MPa tends to cause problems in the pressure resistance or durability of the high-pressure dispersing machine.

Therefore, the treatment pressure is preferably 300 MPa or lower.

The orifice mentioned above refers to the mechanism of rapidly restricting the passage of a straight tube by inserting a thin plate having, for example, a round fine hole (orifice plate) into the straight tube. The slit mentioned above refers to the mechanism in which a pair of members made of a robust material such as a metal or diamond are arranged to have a slight gap. When the solution to be dispersed is allowed to pass through the orifice or the slit in the high-pressure dispersion treatment, the differential pressure between upstream and downstream sides is preferably 50 MPa or more, more preferably 100 MPa or more, particularly preferably 130 MPa or more, because the high-pressure dispersion treatment is more effective. A differential pressure of 300 MPa or less tends to cause no problem in the pressure resistance or durability of the high-pressure dispersing machine. Therefore, the differential pressure is preferably 300 MPa or less. Specific examples of the high-pressure homogenizer include Nanovator (trade name) manufactured by Yoshida Kikai Co., Ltd., Microfluidizer (trade name) manufactured by Microfluidics Corp., and Altimizer manufactured by Sugino Machine Ltd.

The number of runs of the high-pressure dispersion treatment is not particularly limited and preferably ranges from 1 to dozens of runs. This is because too many runs of the dispersion treatment do not exert an effect appropriate to the increased number of runs. In the high-pressure dispersion treatment, high shear force can arise during counter collision or during passing through the rapidly restricted passage and thereby enhance the dispersibility of the polyanion or the complex contained in the solution to be dispersed. In principle, the solution after the high-pressure dispersion treatment using the high-pressure dispersing machine has an elevated temperature. Therefore, it is preferred that the temperature of the solution to be dispersed before the dispersion treatment should be kept low in advance. However, it is preferred to control the temperature such that the solution to be dispersed is not frozen, because the properties of the solution to be dispersed may be changed by freezing. Thus, the temperature of the solution to be dispersed before the dispersion treatment is preferably 0 to 60° C., more preferably 0 to 40° C., particularly preferably 0 to 30° C., when the dispersion medium is water. When the temperature of the solution to be dispersed before the dispersion treatment is 60° C. or lower, the pi-conjugated conductive polymer or the polyanion can be prevented from being denatured. The solution after the high-pressure dispersion treatment may be further cooled through a heat exchanger having a refrigerant temperature of −30 to 20° C.

(2) Electrolytic Oxidation Step

In the method for producing the capacitor of this embodiment, first, the surface of an anode made of a valve metal is electrolytically oxidized for chemical conversion coating in an electrolytic oxidation step to form a dielectric layer. Examples of a method for electrolytically oxidizing the anode surface include a method of anodizing the anode surface by the application of voltage in an electrolytic solution such as an aqueous ammonium adipate solution.

(3) Cathode Arrangement Step

Next, a cathode formed from an electric conductor such as an aluminum foil is arranged to face the surface of the dielectric layer via a separator.

(4) Solid Electrolyte Layer Formation Step

Next, in a solid electrolyte layer formation step, a solid electrolyte layer is formed between the dielectric layer and the cathode. Examples of a method for forming the solid electrolyte layer include a method of dipping an element having the dielectric layer and the cathode in the conductive polymer solution, a method of coating the surface of the dielectric layer with the conductive polymer solution using a known coating apparatus, and a method of spraying the conductive polymer solution onto the surface of the dielectric layer using a known spraying apparatus. If necessary, a reduced-pressure state may be created during the dipping or the coating. After the dipping in or coating with the conductive polymer solution, it is preferred to dry the resultant by a known drying method such as hot-air drying.

In the capacitor, if necessary, an electrolytic solution may be filled into between the dielectric layer and the cathode. The electrolytic solution is not particularly limited as long as the electrolytic solution has a high electrical conductivity. Examples thereof include a solution containing a well-known electrolyte dissolved in a well-known solvent for an electrolytic solution. Examples of the solvent for an electrolytic solution include: alcohol solvents such as ethylene glycol, diethylene glycol, propylene glycol, 1,4-butanediol and glycerin; lactone solvents such as γ-butyrolactone γ-valerolactone, and δ-valerolactone; amide solvents such as N-methylformamide, N,N-dimethylformamide, N-methylacetamide and N-methylpyrrolidinone; nitrile solvents such as acetonitrile and 3-methoxypropionitrile; and water. Examples of the electrolyte include electrolytes containing an anion component such as an organic acid including adipic acid, glutaric acid, succinic acid, benzoic acid, isophthalic acid, phthalic acid, terephthalic acid, maleic acid, toluic acid, enanthic acid, malonic acid, formic acid, decanedicarboxylic acid (e.g., 1,6-decanedicarboxylic acid and 5,6-decanedicarboxylic acid), octanedicarboxylic acid (e.g., 1,7-octanedicarboxylic acid), azelaic acid and sebacic acid, or an inorganic acid including boric acid, a polyhydric alcohol complex compound of boric acid obtained from boric acid and a polyhydric alcohol, phosphoric acid, carbonic acid and silicic acid, and a cation component such as primary amine (methylamine, ethylamine, propylamine, butylamine, ethylenediamine, etc.), secondary amine (dimethylamine, diethylamine, dipropylamine, methylethylamine, diphenylamine, etc.), tertiary amine (trimethylamine, triethylamine, tripropylamine, triphenylamine, 1,8-diazabicyclo(5,4,0)-undecene-7, etc.), or tetraalkylammonium (tetramethylammonium, tetraethylammonium, tetrapropylammonium, tetrabutylammonium, methyltriethylammonium, dimethyldiethylammonium, etc.).

(5) Application Step

Next, in an application step, the treatment of applying direct-current voltage to between the anode and the cathode is performed to obtain a condenser. The direct-current voltage to be applied is not particularly limited and is preferably 30% or more, more preferably 50% or more, particularly preferably 80% or more, of the rated voltage of the resulting condenser because leakage current is smaller. Here, the rated voltage is a value depending on, for example, applied voltage (formation voltage) for the electrolytic oxidation of the anode. Usually, the rated voltage is set to be equal to or lower than the formation voltage. The voltage to be applied in the application step is preferably 20% or more, more preferably 30% or more, particularly preferably 40% or more, of the formation voltage in the electrolytic oxidation step because leakage current is smaller.

The ambient temperature in the application step is preferably 30° C. or higher, more preferably 40 to 200° C., particularly preferably 80 to 180° C., most preferably 100 to 160° C., because leakage current can be smaller. The time required for the application step is appropriately adjusted according to the direct-current voltage to be applied or the ambient temperature. For example, for smaller leakage current, the application time is preferably longer at lower direct-current voltage to be applied. Specifically, when the direct-current voltage to be applied is less than 50% of the rated voltage of the condenser, the application time is preferably 5 minutes or longer for smaller leakage current. The application time may be shortened at high direct-current voltage to be applied. Specifically, when the direct-current voltage to be applied is 50% or more of the rated voltage of the condenser, leakage current can be decreased even if the application time is shorter than 5 minutes. For smaller leakage current, the application time is preferably longer at lower ambient temperature. The application time may be shortened at higher ambient temperature.

EXAMPLES

Next, Examples of the present invention will be described. However, the present invention is not limited by Examples given below.

PRODUCTION EXAMPLES

Production Example 1

Synthesis of Solubilized Polymer 206 g of sodium styrenesulfonate was dissolved in 1,000 ml of ion-exchange water. To the solution, a solution containing 1.14 g of an ammonium persulfate oxidizing agent dissolved in 10 ml of water in advance was added dropwise over 20 minutes with stirring at 80° C. The resulting solution was stirred for 12 hours. To the obtained sodium styrenesulfonate-containing solution, 1,000 ml of sulfuric acid diluted to 10% by mass was added. Approximately 1,000 ml aliquot of the polystyrenesulfonic acid-containing solution was removed by the ultrafiltration method. To the remaining solution, 2,000 ml of ion-exchange water was added, and approximately 2,000 ml aliquot of the solution was removed by the ultrafiltration method. The ultrafiltration operation described above was repeated 3 times. To the obtained filtrate, approximately 2,000 ml of ion-exchange water was further added, and approximately 2,000 ml aliquot of the solution was removed by the ultrafiltration method. This ultrafiltration operation was repeated 3 times. Water in the obtained solution was removed under reduced pressure to obtain colorless solid polystyrenesulfonic acid.

Production Example 2

Synthesis of Conductive Polymer Solution Containing pi-Conjugated Conductive Polymer and Polyanion 14.2 g of 3,4-ethylenedioxythiophene was mixed with a solution containing 36.7 g of polystyrenesulfonic acid dissolved in 2,000 ml of ion-exchange water at 20° C. The mixed solution thus obtained was kept at 20° C., and 29.64 g of ammonium persulfate dissolved in 200 ml of ion-exchange water and 8.0 g of an oxidation catalyst solution of ferric sulfate were gradually added thereto with stirring and reacted by stirring for 3 hours. To the obtained reaction solution, 2,000 ml of ion-exchange water was added, and approximately 2,000 ml aliquot of the solution was removed by the ultrafiltration method. This operation was repeated 3 times. To the obtained solution, 200 ml of sulfuric acid diluted to 10% by mass and 2,000 ml of ion-exchange water were further added, and approximately 2,000 ml aliquot of the solution was removed by the ultrafiltration method. To the filtrate, 2,000 ml of ion-exchange water was added, and approximately 2,000 ml aliquot of the solution was removed by the ultrafiltration method. This operation was repeated 3 times. To the obtained solution, 2,000 ml of ion-exchange water was further added, and approximately 2,000 ml aliquot of the solution was removed by the ultrafiltration method. This operation was repeated 5 times to obtain a 2.0% polystyrenesulfonic acid-doped poly(3,4-ethylenedioxythiophene) solution (aqueous PEDOT-PSS solution).

EXAMPLES

Example 1

8.0 g of glycidol and 15 g of water were added to 85 g of the aqueous PEDOT-PSS solution obtained in Production Example 2, and the mixture was stirred at 50° C. for 8 hours to prepare a solution. The obtained solution had a pH of 2.10.

Example 2

A solution was prepared under the same conditions as in Example 1 except that the amount of glycidol added was changed from 8.0 g to 12.0 g. The obtained solution had a pH of 2.18.

Example 3

5.75 g of glycidol and 40 g of water were added to 60 g of the aqueous PEDOT-PSS solution obtained in Production Example 2, and the mixture was stirred at 50° C. for 8 hours to prepare a solution. The obtained solution had a pH of 2.18.

Example 4

A solution was prepared under the same conditions as in Example 3 except that the amount of glycidol added was changed from 5.75 g to 12.0 g. The obtained solution had a pH of 2.32.

Example 5

A solution was prepared under the same conditions as in Example 3 except that the amount of glycidol added was changed from 5.75 g to 17.5 g, and the stirring at 50° C. for 8 hours was changed to stirring at 50° C. for 4 hours. The obtained solution had a pH of 3.08.

Example 6

A solution was prepared under the same conditions as in Example 5 except that the amount of glycidol added was changed from 17.5 g to 23.0 g. The obtained solution had a pH of 3.48.

Example 7

A solution was prepared under the same conditions as in Example 5 except that the amount of glycidol added was changed from 17.5 g to 28.0 g. The obtained solution had a pH of 3.81.

Example 8

A solution was prepared under the same conditions as in Example 5 except that the amount of glycidol added was changed from 17.5 g to 34.5 g. The obtained solution had a pH of 4.11.

Example 9

A solution was prepared under the same conditions as in Example 4 except that the amount of glycidol added was changed from 12.0 g to 46.6 g. The obtained solution had a pH of 4.11.

Example 10

5.96 g of propylene oxide and 40 g of water were added to 60 g of the aqueous PEDOT-PSS solution obtained in Production Example 2, and the mixture was stirred at 50° C. for 8 hours to prepare a solution. The obtained solution had a pH of 2.45.

Example 11

8.66 g of 2-{2-[2-(2-butoxy-ethoxy)-ethoxy]-ethoxy}-oxirane and 40 g of water were added to 60 g of the aqueous PEDOT-PSS solution obtained in Production Example 2, and the mixture was stirred at 50° C. for 8 hours to prepare a solution. The obtained solution had a pH of 2.10.

Example 12

68.6 g of glycidol and 40 g of water were added to 60 g of the aqueous PEDOT-PSS solution obtained in Production Example 2, and the mixture was stirred at 50° C. for 8 hours to prepare a solution. The obtained solution had a pH of 4.30.

Example 13

A solution was prepared under the same conditions as in Example 12 except that the amount of glycidol added was changed from 68.6 g to 114.4 g. The obtained solution had a pH of 4.01.

Example 14

A solution was prepared under the same conditions as in Example 11 except that the amount of 2-{2-[2-(2-butoxy-ethoxy)-ethoxy]-ethoxy}-oxirane added was changed from 8.66 g to 5.0 g. The obtained solution had a pH of 2.05.

Example 15

5.0 g of 2-{2-[2-(2-butoxy-ethoxy)-ethoxy]-ethoxy}-oxirane and 60 g of water were added to 40 g of the aqueous PEDOT-PSS solution obtained in Production Example 2, and the mixture was stirred at 50° C. for 8 hours to prepare a solution. The obtained solution had a pH of 2.13.

COMPARATIVE EXAMPLES

Comparative Example 1

0.176 g of imidazole and 40 g of water were added to 60 g of the aqueous PEDOT-PSS solution obtained in Production Example 2, and the mixture was stirred at 50° C. for 8 hours to prepare a solution. The obtained solution had a pH of 2.48.

Comparative Example 2

A solution was prepared under the same conditions as in Comparative Example 1 except that the amount of imidazole added was changed from 0.176 g to 0.32 g. The obtained solution had a pH of 6.83.

Comparative Example 3

0.25 g of imidazole and 15 g of water were added to 85 g of the aqueous PEDOT-PSS solution obtained in Production Example 2, and the mixture was stirred at 50° C. for 8 hours to prepare a solution. The obtained solution had a pH of 2.31.

Comparative Example 4

A solution was prepared under the same conditions as in Comparative Example 3 except that the amount of imidazole added was changed from 0.25 g to 0.45 g. The obtained solution had a pH of 6.89.

Comparative Example 5

15 g of water was added to 85 g of the aqueous PEDOT-PSS solution obtained in Production Example 2, and the mixture was stirred at 50° C. for 8 hours to prepare a solution. The obtained solution had a pH of 1.82.

Comparative Example 6

40 g of water was added to 60 g of the aqueous PEDOT-PSS solution obtained in Production Example 2, and the mixture was stirred at 50° C. for 8 hours to prepare a solution. The obtained solution had a pH of 1.70.

The production conditions and solution characteristics of each of Examples and Comparative Examples are shown in Tables 1 and 2. In the tables, Comp. represents an oxirane and/or oxetane group-containing organic compound; CP represents a conductive polymer solution; G1 represents glycidol; PO represents propylene oxide; BEE represents 2-{2-[2-(2-butoxy-ethoxy)-ethoxy]-ethoxy}-oxirane; and IZ represents imidazole. In the tablets, Comp./CP represents the ratio of the oxirane and/or oxetane group-containing organic compound to the conductive polymer in the conductive polymer solution.

TABLE 2

| | Comparative example | | | | | |
|---|---|---|---|---|---|---|
| | 1 | 2 | 3 | 4 | 5 | 6 |
| Comp. | IZ | | | | Free | |
| CP (g) | 60 | 60 | 85 | 85 | 85 | 60 |
| Water (g) | 40 | 40 | 15 | 15 | 15 | 40 |
| CP Concentration (%, Calc) | 1.2 | 1.2 | 1.7 | 1.7 | 1.7 | 1.2 |
| Comp. (g) | 0.176 | 0.32 | 0.25 | 0.45 | Free | |
| Comp./CP | 0.15 | 0.27 | 0.15 | 0.26 | — | — |
| Condition of reaction | | | 50° C. 8 hr | | | |
| pH | 2.48 | 6.83 | 2.31 | 6.89 | 1.82 | 1.7 |

<Production of Capacitor>
(Production of Element for Capacitor)

An anode lead terminal was connected to an etched aluminum foil (anode foil). Then, voltage of 150 V was applied thereto for chemical conversion (oxidation treatment) in an aqueous solution containing 10% by mass of ammonium adipate so that dielectric layers were formed on both sides of the aluminum foil to obtain an anode foil. Next, opposite aluminum cathode foils welded with a cathode lead terminal were laminated on both sides of the anode foil via cellulose separators, and the resultant was rolled up into a cylindrical form to obtain an element for a capacitor.

(Production of Capacitor)

The element for a capacitor obtained as described above was dipped under reduced pressure in the conductive polymer solution produced in each of Examples and Comparative Examples, and then dried for 10 minutes in a hot-air dryer of 120° C. to form a solid electrolyte layer containing a conductive polymer complex on the dielectric layer surface. The element for a capacitor was further loaded in an aluminum case, which was then sealed with a seal rubber to prepare a capacitor.

The capacitance and dielectric loss tangent (tan$\sigma$) at 120 Hz and ESR at 100 kHz of the obtained capacitor were measured using LCR meter 2345 (manufactured by NF Corp.).

<Evaluation of Capacitor>

Tables 3, 4 and 5 show the performance evaluation of the capacitor containing the conductive polymer solution of each of Examples and Comparative Examples.

TABLE 1

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Comp. | | | | | GI | | | | | PO | BEE | GI | | BEE | |
| CP (g) | 85 | 85 | 60 | 60 | 60 | 60 | 60 | 60 | 60 | 60 | 60 | 60 | 60 | 60 | 40 |
| Water (g) | 15 | 15 | 40 | 40 | 40 | 40 | 40 | 40 | 40 | 40 | 40 | 40 | 40 | 40 | 60 |
| CP Concentration (%, Calc) | 1.7 | 1.7 | 1.2 | 1.2 | 1.2 | 1.2 | 1.2 | 1.2 | 1.2 | 1.2 | 1.2 | 1.2 | 1.2 | 1.2 | 0.8 |
| Comp. (g) | 8 | 12 | 5.75 | 12 | 17.5 | 23 | 28 | 34.5 | 46.6 | 5.96 | 8.66 | 68.6 | 114.4 | 5 | 5 |
| Comp./CP | 4.7 | 7.1 | 4.8 | 10 | 14.6 | 19.2 | 23.3 | 28.8 | 38.8 | 5 | 7.2 | 57.2 | 95.3 | 4.2 | 6.3 |
| Condition of reaction | | 50° C. 8 hr | | | 50° C. 4 hr | | | 50° C. 8 hr | | | | 50° C. 8 hr | | | |
| pH | 2.1 | 2.18 | 2.18 | 2.32 | 3.08 | 3.48 | 3.81 | 4.11 | 4.11 | 2.45 | 2.1 | 4.3 | 4.01 | 2.05 | 2.13 |

TABLE 3

| | Example | | | | | | |
|---|---|---|---|---|---|---|---|
| | 1 | 2 | 3 | 4 | 5 | 6 | 7 |
| Cap. [μF] | 35.36 | 35.17 | 34.65 | 35.04 | 34.36 | 33.39 | 34.13 |
| tan δ (D) | 0.01699 | 0.01247 | 0.03403 | 0.02487 | 0.02 | 0.0241 | 0.0231 |
| ESR [mΩ] | 30.13 | 16.9 | 67.51 | 32.4 | 23.39 | 22.27 | 20.55 |

TABLE 4

| | Example | | | | | | | |
|---|---|---|---|---|---|---|---|---|
| | 8 | 9 | 10 | 11 | 12 | 13 | 14 | 15 |
| Cap. [μF] | 33.42 | 34.33 | 32.32 | 33.25 | 33.25 | 31.9 | 33.53 | 32.68 |
| tan δ (D) | 0.0239 | 0.0192 | 0.063 | 0.0525 | 0.0301 | 0.0454 | 0.051 | 0.0581 |
| ESR [mΩ] | 20.19 | 19.67 | 37.9 | 19.67 | 21.43 | 23.94 | 30.94 | 28.12 |

TABLE 5

| | Comparative example | | | | | |
|---|---|---|---|---|---|---|
| | 1 | 2 | 3 | 4 | 5 | 6 |
| Cap. [μF] | 20.77 | 6.76 | 26.87 | 13.07 | 27.73 | 29.52 |
| tan δ (D) | 0.3655 | 0.4668 | 0.243 | 0.4245 | 0.7199 | 0.4556 |
| ESR [mΩ] | 930.57 | 2994.97 | 500.32 | 1222.84 | 19236.7 | 8858.17 |

<Discussion>

When Examples 1 to 15 were compared with Comparative Examples 1 to 6, the capacitor of each Example had lower ESR and a higher capacitance than those of the capacitor of each Comparative Example. This suggests that the performance of the capacitor can be set to low ESR and a high capacitance by setting the pH of the solution to the range of 2.0 to 6.0 using propylene oxide, glycidol or 2-{2-[2-(2-butoxy-ethoxy)-ethoxy]-ethoxy}-oxirane.

INDUSTRIAL APPLICABILITY

The present invention can be effectively utilized in a capacitor, etc.

The invention claimed is:

1. A conductive polymer solution having a conductive polymer and a solvent, wherein
the conductive polymer comprises
a pi-conjugated conductive polymer,
a polyanion with which the pi-conjugated conductive polymer is doped, and
a compound formed by reacting an oxirane or oxetane group which is needed to increase the strong acidity of a solution derived from the anion group of the polyanion to a weak acidic region of a pH in the range of 2.0 to 6.0 with an anion making no contribution to the dope in the polyanion, and
the solution has a pH in the range of 2.0 to 6.0.

2. The conductive polymer solution of claim 1, wherein the pi-conjugated conductive polymer is polyethylenedioxythiophene.

3. The conductive polymer solution of claim 1, wherein the polyanion is polystyrenesulfonic acid.

4. The conductive polymer solution claim 1, wherein an organic compound containing the oxirane or oxetane group is one or two or more compounds selected from propylene oxide, glycidol, 2-[2-(2-butoxy-ethoxy)-ethoxy]-oxirane and 2-{2-[2-(2-butoxy-ethoxy)-ethoxy]-ethoxy}-oxirane.

5. A capacitor including: an anode made of a porous body of a valve metal; a dielectric layer formed by oxidizing the anode surface; a conductive cathode disposed on a side opposite to the anode on the dielectric layer; and a solid electrolyte layer formed between the dielectric layer and the cathode, wherein
the capacitor comprises the conductive polymer solution of claim 1 or a compound formed by the removal of the solvent from the solution.

6. A method for producing a capacitor, comprising impregnating the capacitor of claim 5 with the conductive polymer solution of claim 1, and removing the solvent constituting the conductive polymer solution.

* * * * *